United States Patent [19]
Tipping

[11] 3,763,718
[45] Oct. 9, 1973

[54] HYDROMECHANICAL TRANSMISSION
[75] Inventor: Roderick G. Tipping, Indianapolis, Ind.
[73] Assignee: General Motors Corporation, Detroit, Mich.
[22] Filed: July 28, 1972
[21] Appl. No.: 276,180

[52] U.S. Cl.................................... 74/687, 74/705
[51] Int. Cl....................... F16h 47/04, F16h 37/06
[58] Field of Search............................ 74/687, 720.5

[56] References Cited
UNITED STATES PATENTS
| | | | |
|---|---|---|---|
| 2,897,691 | 8/1959 | Lowe | 74/687 X |
| 3,283,612 | 11/1966 | Densham | 74/687 |
| 3,404,584 | 10/1968 | Trautmann | 74/687 |
| 3,667,321 | 6/1972 | Maurice | 74/687 |
| 3,675,507 | 7/1972 | Takekawa | 74/687 |

*Primary Examiner*—Arthur T. McKeon
*Attorney*—W. E. Finken et al.

[57] ABSTRACT

A hydromechanical transmission providing a hydrostatic drive in low range and a hydromechanical drive in high range. The output of the hydrostatic portion drives a pair of clutches, one of which is selectively engageable to provide a drive to the transmission output and the other is selectively engageable to provide an input to a planetary gear set which combines the hydrostatic drive with a mechanical input which combined drive is directed to the transmission output. The shift point for the interchange of the clutches occurs at a synchronous speed point.

6 Claims, 3 Drawing Figures

PATENTED OCT 9 1973 3,763,718

HYDROMECHANICAL TRANSMISSION

This invention relates to power transmissions and more particularly to power transmissions having a hydrostatic low range drive and a hydromechanical higher range drive with a synchronous speed shift point between the ranges.

The present invention utilizes a hydrostatic transmission coupled with a mechanical gear arrangement to provide two infinitely variable forward speed ranges and two infinitely variable reverse speed ranges. The shift point between the forward speed ranges occurs at a synchronous speed point in the mechanical gearing to permit the interchange of a pair of clutches when there is zero slip speed between the clutch elements of the oncoming clutch.

The hydrostatic portion of the transmission has an output member connected to drive the input members of a pair of selectively engageable clutches. The engagement of one of the clutches establishes a reduction gear drive between the output member and the hydrostatic portion and the transmission output member. The engagement of the other clutch establishes a drive between the output member of the hydrostatic portion and one member of a planetary gearing arrangement. Another member of the planetary gearing arrangement is connected to be continuously driven by the transmission input and a third member of the planetary gearing arrangement is drivingly connected to the transmission output. Thus, when the one clutch is engaged a hydrostatic drive is established between the transmission input and output which drive is made infinitely variable by controlling the drive ratio in the hydrostatic portion of the transmission. When the other clutch is engaged a hydromechanical drive is accomplished between the transmission input and output members which drive is made infinitely variable by controlling the drive ratio in the hydrostatic portion.

It is therefore an object of this invention to provide in an improved hydromechanical transmission a hydrostatic drive unit which is coupled to a mechanical gearing arrangement through a pair of selectively operable clutches to provide an infinitely variable hydrostatic drive when one clutch is engaged and an infinitely variable hydromechanical drive range when the other clutch is engaged wherein the interchange of the clutches occurs at a synchronous speed point.

Another object of this invention is to provide an improved hydromechanical transmission having a hydrostatic portion operatively connected with the transmission output through a selectively engageable clutch to provide an infinitely variable hydrostatic speed range and a second selectively engageable clutch adapted to connect the hydrostatic portion to a planetary gear member wherein a second planetary gear member is driven by the transmission input and a third planetary gear member drives the transmission output.

Another object of this invention is to provide an improved hydromechanical transmission wherein low forward and reverse drive ranges are provided between the transmission input and output by an infinitely variable hydrostatic transmission, a first selectively engageable clutch, and a mechanical gear reduction and a second infinitely variable forward speed range is provided by the hydrostatic transmission, a second selectively engageable clutch and a planetary gearing arrangement which combines the transmission input with the hydrostatic transmission output and wherein the interchange of the first and second clutches occurs at a synchronous speed point.

These and other objects and advantages of the present invention will be more apparent from the following description and drawings in which.

Figure 1:
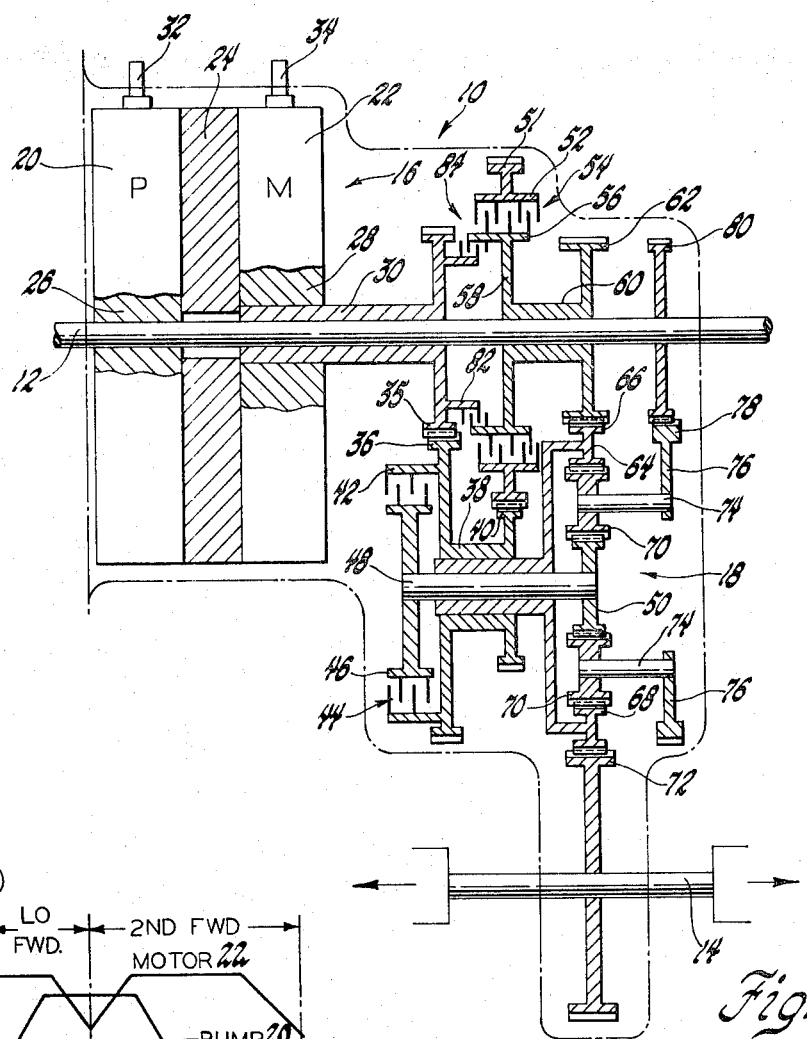
FIG. 1 is a schematic representation of the transmission.

Referring to the FIG. 1 there is shown a hydromechanical transmission generally designated 10 having an input shaft 12, an output shaft 14, a hydromechanical transmission portion 16 and a mechanical gearing portion 18. The transmission input shaft 12 is adapted to be driven by a prime mover such as a gas turbine or internal combustion engine, not shown. Preferably, the input shaft 12 is driven at a fixed speed and therefore the prime mover is governed.

The hydrostatic transmission 16 includes a variable displacement fluid pump 20 and a variable displacement fluid motor 22 which are in fluid communication through a separator plate 24 by fluid passages, not shown. The pump 20 is of any conventional positive displacement type fluid pump and may be designed in a manner similar to that shown in U.S. Pat. No. 3,274,946 issued to E. E. Simmons. The pump 20 includes a rotating member 26 drivingly connected with the input shaft 12 which extends through the transmission to provide a PTO. The motor 22 is a conventional positive displacement type fluid motor which may be of similar construction with the pump 20 and includes a rotating output member 28 drivingly connected to an output sleeve shaft 30. The pump 20 and preferably the motor 22 are both of the variable displacement type and have conventional servo controls 32 and 34 respectively which may be manually, hydraulically, electrically or otherwise manipulated to control the displacement of the pump 20 and the motor 22 in any well known manner.

The sleeve shaft 30 has secured thereon a drive gear 35 which forms a part of the mechanical gearing arrangement 18. The gear 35 meshes with a gear 36 which is part of a cluster gear 38 which also includes a second gear portion 40. The cluster gear 38 has a hub 42 which forms the input member of a selectively engageable clutch 44. The clutch 44 also has an output member 46 which is drivingly secured to a shaft 48 which is also secured to a sun gear 50. The clutch 44 is a conventional selectively engageable friction disc type clutch which may be operated by any of the well known clutch controls. Preferably the clutch 44 is fluid operated.

The gear 40 meshes with a gear 51 which has formed thereon a hub 52 which provides an input member of a selectively engageable clutch 54. The clutch 54 is similar in construction to the clutch 44 and includes an output member 56 which is drivingly connected through a hub 58 and a sleeve shaft 60 to a gear 62. The sleeve shaft 60 is rotatably supported on the input shaft 12. The gear 62 meshes with an annulus gear 64 having an external set of gear teeth 66 meshing with the gear 62 and an internal set of gear teeth forming a ring gear 68 meshing with a plurality of pinion gears 70. The externally toothed gear 66 also meshes with an output gear 72 and is drivingly secured to the output shaft 14.

The sun gear 50, ring gear 68 and pinion gears 70 are components of a simple planetary gear set. The pinion gears 70 are rotatably mounted on pins 74 which are secured to a carrier 76 which is also a member of the simple planetary gear set. The carrier 76 has a gear component 78 secured thereto which gear 78 meshes with a gear 80 which is drivingly connected to the input shaft 12.

The sleeve shaft 30 has formed thereon a hub 82 which is an input member of a conventional selectively engageable clutch 84, similar in design to clutches 44 and 54, the output of which is connected to the output member 56 of the clutch 54.

OPERATION

The transmission 10 is in neutral when all of the clutches 44, 54 and 84 are disengaged or when the pump 20 is at zero displacement and the clutch 44 is disengaged. To establish low range forward the clutch 54 is engaged while the pump 20 is at zero displacement and the remaining clutches are disengaged. To increase the speed of the output shaft 14 in a forward direction from zero the displacement of pump 20 is increased through the manipulation of servo control 32 until maximum positive pump displacement is achieved. As the displacement of pump 20 is increased the motor 22 will be driven by the fluid displaced by pump 20 thereby driving the sleeve shaft 30. The drive from sleeve shaft 30 is transmitted at a reduced speed and increased torque to the output shaft 14 through gears 35, 36, 40 and 51, clutch 54 and gears 62, 66 and 72. When the maximum displacement of pump 20 is achieved a further increase in the speed of output shaft 14 is accomplished by reducing the displacement of motor 22 through manipulation of the servo control 34. During operation of the transmission in low range the input member 42 of clutch 44 is driven by the output of the hydraulic motor 22 and the output member 46 of clutch 44 is driven by the input shaft 12, gears 80 and 78, and the simple planetary gear set. At a predetermined displacement of the motor 22 the input and output members of the clutch 44 will be rotating at the same speed and in the same direction. When this synchronous speed point of the members of clutch 44 is achieved the clutch 44 may be engaged and the clutch 54 may be disengaged. Since the clutch members are synchronous there is no slippage and no torque transmitted during the engagement of the clutch 44. When the clutch 54 is disengaged, however, the clutch 44 then carries a portion of the torque in the transmission.

After the interchange of clutches 44 and 54 the drive between the input shaft 12 and the output shaft 14 is transmitted through gear 80 to gear 78, carrier 76, pinions 70, gears 68, 66 and 72. The sun gear 50 becomes a reaction member in the simple planetary system with the reaction being taken through the clutch 44 and the hydrostatic portion of the transmission. Thus, in the first portion of the second speed range power is regenerated from the sun gear 50 through the hydrostatic transmission 16 to the input shaft 12. During the first portion of the second forward speed range the pump displacement is maintained at maximum while the motor displacement is increased to maximum. When the motor displacement is at maximum the pump displacement is then decreased to zero. During this portion of the second speed range the speed of the hydraulic motor 22 and therefore the speed of sun gear 50 is continuously decreasing therefore the speed of ring gear 68 will continuously increase since the speed or carrier 76 is maintained at a constant value. When the displacement of pump 20 is at zero during the second speed range the drive from the input shaft 12 to the output shaft 14 will be a mechanical drive with the hydrostatic transmission being held at zero speed ratio so that the sun gear 50 is stationary. To provide a further increase in speed in the second speed range the pump displacement is increased in the opposite or negative direction relative to the displacement increase during the low speed range. Therefore, the fluid delivered to the motor 22 is in the opposite direction thus the motor 22 will rotate in the opposite direction. The sun gear 50 is therefore driven in the opposite direction providing an increasing speed component in the planetary gear set which is transmitted to the ring gear 68 and thereby to the output shaft 14. As the displacement of pump 20 is increased, the speed of the output shaft 14 will be increased. When the pump 20 has attained maximum displacement the motor 20 is then decreased in displacement to a predetermined minimum value thus establishing the maximum speed of output shaft 14. The output speed may be reduced by reversely manipulating the pump and motor displacements and the clutches 44 and 54.

To provide a reverse drive in the transmission between input shaft 12 and output shaft 14 the clutch 54 is engaged while the clutches 44 and 84 are disengaged and the displacement of pump 20 is increased in the negative direction from zero. The drive through the gearing 18 to the output shaft 14 is the same in low reverse as explained above for low forward, however, the output shaft 30 of the motor 22 is rotated in the opposite direction therefore the output shaft 14 rotates in the opposite direction. There is no synchronous shift point in reverse, however, a high speed-low torque drive range is provided in reverse by disengaging clutches 44 and 54 while engaging clutch 84. The pump and motor displacements are changed the same as in the low reverse drive ratio, however, the gear reduction between gears 35, 36, 40 and 51 are eliminated from the drive train by actuation of the clutch 84 which is in parallel drive relation thereto. With the clutch 84 engaged the output shaft 30 of the motor 22 is connected directly to the hub 58. Therefore, during the high speed-low torque reverse drive the output shaft 30 drives the output shaft 14 through gears 62, 66 and 72.

Figure 2:
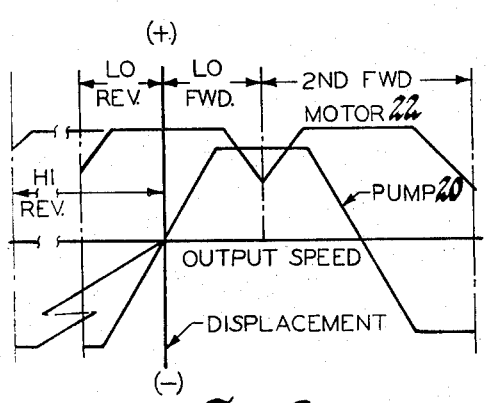
FIG. 2 is a graph showing the displacements of the various hydraulic components in the transmission.
Figure 3:
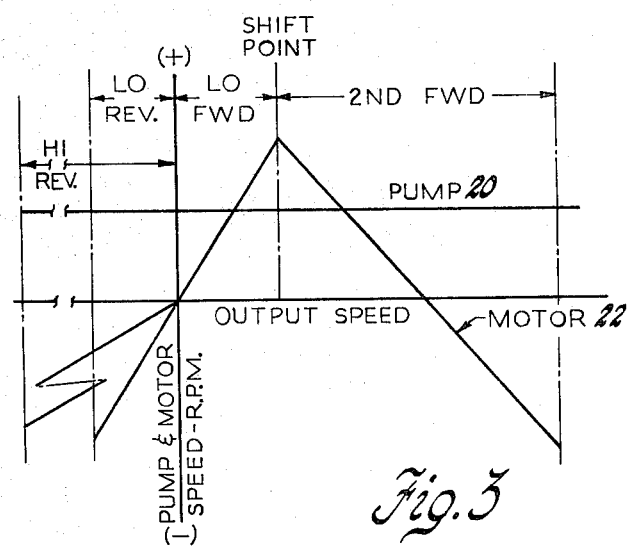
FIG. 3 is a graph showing the speeds of the hydraulic transmission components.

FIGS. 2 and 3 graphically show the displacement changes in the pump 20 and motor 22 and the resulting speed changes in the hydraulic motor 22 which accomplish the above described drive ranges. While the above description and the graphs in FIG. 2 describe the motor as being a variable displacement hydraulic unit a fixed displacement hydraulic motor could be used, however, the shift point and the gear ratios used in the gearing 18 would have to be changed accordingly.

Obviously, many modifications and variations of the present invention are possible in light of the above teachings. It is, therefore, to be understood that within the scope of the appended claims the invention may be practiced otherwise than as specifically described.

What is claimed is:

1. A hydromechanical transmission comprising in combination, input means for providing a drive thereto; output means for providing a drive therefrom; variable ratio hydrostatic transmission means drivingly connected with said input means being operable to provide infinitely variable ratios within a range of ratios; and drive means for transmitting drives from said input means and said hydrostatic transmission to said output means including first selectively engageable and disengageable clutch means having an input member drivingly connected with said hydrostatic transmission and an output member, gear reduction means drivingly connected between said first clutch means output member and said output means, second selectively engageable and disengageable clutch means having an input member drivingly connected with said hydrostatic transmission and an output member, and planetary gear means having a first planetary member drivingly connected with said second clutch means output member, a second planetary member drivingly connected with said input means, and a third planetary member drivingly connected with said output means; said first and second clutch means being selectively and synchronously interchangeable at a predetermined ratio in said hydrostatic transmission to provide a hydrostatic drive between said input and output means when said first clutch means is engaged and said second clutch means is disengaged and to provide a hydromechanical drive between said input and output means when said second clutch means is engaged and said first clutch means is disengaged.

2. A hydromechanical transmission comprising in combination, input means for providing a drive thereto; output means for providing a drive therefrom; variable ratio hydrostatic transmission means drivingly connected with said input means being operable to provide infinitely variable ratios within a range of ratios; drive means for transmitting drives from said input means and said hydrostatic transmission to said output means including first selectively engageable and disengageable clutch means having an input member drivingly connected with said hydrostatic transmission and an output member, gear reduction means drivingly connected between said first clutch means output member and said output means, second selectively engageable and disengageable clutch means having an input member drivingly connected with said hydrostatic transmission and an output member, and planetary gear means having a sun gear drivingly connected with said second clutch means output member, a planet carrier drivingly connected with said input means, and a ring gear drivingly connected with said output means; and third clutch means selectively engageable between said hydrostatic transmission and said output means in parallel with a portion of said gear reduction means for providing a high speed-low torque reverse drive ratio between said input and output means; said first and second clutch means being selectively and synchronously interchangeable at a predetermined ratio in said hydrostatic transmission to provide a hydrostatic drive between said input and output means when said first clutch means is engaged and said second clutch means is disengaged, and to provide a hydromechanical drive between said input and output means when said second clutch means is engaged and said first clutch means is disengaged.

3. A hydromechanical transmission comprising in combination, input means for providing an input drive thereto; output means for providing a drive therefrom; variable ratio hydrostatic transmission means drivingly connected with said input means being operable to provide infinitely variable ratios within a range of ratios; and drive means for transmitting drives from said input means to said output means including first selectively engageable and disengageable clutch means having an input member drivingly connected with said hydrostatic transmission and an output member, gear reduction means drivingly connected between said first clutch means output member and said output means, second selectively engageable and disengageable clutch means having an input member drivingly connected with said hydrostatic transmission and an output member, and planetary gear means having a sun gear drivingly connected with said second clutch means output member, a planetary carrier continuously drivingly connected with said input means, and a ring gear drivingly connected with said output means; said first and second clutch means being selectively and synchronously interchangeable at a predetermined ratio in said hydrostatic transmission to provide a hydrostatic drive between said input and output means when said first clutch means is engaged and said second clutch means is disengaged, and to provide a hydromechanical drive between said input and output means when said second clutch means is engaged and said first clutch means is disengaged.

4. A hydromechanical transmission comprising; input means; output means; variable ratio hydraulic transmission means including pump means drivingly connected with said input means, motor means in fluid communication with said pump means, and an output member drivingly connected with said motor means; drive reduction gear means including a first reduction gear member drivingly connected with said output member, cluster gear means having first and second cluster gear members, said first cluster gear member meshing with said first reduction gear member, a second reduction gear member meshing with said second cluster gear member, first selectively operable clutch means drivingly connected with said second reduction gear member, second selectively operable clutch means drivingly connected with said cluster gear means, a third reduction gear member drivingly connected to said first clutch means, and drive gear means drivingly connected to said third reduction gear means and said output means for providing a drive therebetween; and planetary gear means including a first planetary member drivingly connected with said second clutch means, a second planetary member drivingly connected with said output means through said drive gear means, and a third planetary member continuously drivingly connected with said input means; said hydraulic transmission, and said drive reduction gear means being operable to provide a variable ratio hydraulic drive between said input and output means when said first clutch means is operated; said hydraulic transmission, said drive reduction gear means, and said planetary gear means being operable to provide a variable ratio hydromechanical drive between said input and output means when said second clutch means is operated.

5. A hydromechanical transmission comprising; input means; output means; variable ratio hydraulic transmission means including pump means drivingly connected with said input means, motor means in fluid communication with said pump means, and an output member drivingly connected with said motor means; drive reduction gear means including a first reduction gear member drivingly connected with said output member, cluster gear means having first and second cluster gear means, said first cluster gear member meshing with said first reduction gear member, a second reduction gear member meshing with said second cluster gear member, first selectively operable clutch means drivingly connected with said second reduction gear member, second selectively operable clutch means drivingly connected with said cluster gear means, a third reduction gear member drivingly connected to said first clutch means, and drive gear means drivingly connected to said third reduction gear means and said output means for providing a drive therebetween; planetary gear means including a sun gear member drivingly connected with said second clutch means, a ring gear member drivingly connected with said output means through said drive gear means, and a planet carrier member; and input reduction gear means continuously drivingly connecting said input means and said planet carrier; said hydraulic transmission, and said drive reduction gear means being operable to provide a variable ratio hydraulic drive between said input and output means when said first clutch means is operated; said hydraulic transmission, said drive reduction gear means, and said planetary gear means being operable to provide a variable ratio hydromechanical drive between said input and output means when said second clutch means is operated.

6. A hydromechanical transmission comprising; input means; output means; variable ratio hydraulic transmission means including pump means drivingly connected with said input means, motor means in fluid communication with said pump means, and an output member drivingly connected with said motor means; drive reduction gear means including a first reduction gear member drivingly connected with said output member, cluster gear means having first and second cluster gear members, said first cluster gear member meshing with said first reduction gear member, a second reduction gear member meshing with said second cluster gear member, first selectively operable clutch means drivingly connected with said second reduction gear member, second selectively operable clutch means drivingly connected with said cluster gear means, a third reduction gear member drivingly connected to said first clutch means, and drive gear means drivingly connected to said third reduction gear means and said output means for providing a drive therebetween; planetary gear means including a first planetary member drivingly connected with said second clutch means, a second planetary gear member drivingly connected with said output means through said drive gear means, and a third planetary gear member continuously drivingly connected with said input means; and third selectively engageable clutch means in parallel with said cluster gear means for providing a high speed, low torque reverse drive ratio between said input and output means; said hydraulic transmission, and said drive reduction gear means being operable to provide a variable ratio hydraulic drive between said input and output means when said first clutch means is operated; said hydraulic transmission, said drive reduction gear means, and said planetary gear means being operable to provide a variable ratio hydromechanical drive between said input and output means when said second clutch means is operated.

* * * * *